US010676008B2

(12) United States Patent
Rupp

(10) Patent No.: US 10,676,008 B2
(45) Date of Patent: Jun. 9, 2020

(54) METHODS AND SYSTEMS FOR PREPARING, PACKAGING, AND DISTRIBUTING A FROZEN CONFECTION

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 153 days.

(21) Appl. No.: 15/812,178

(22) Filed: Nov. 14, 2017

(65) Prior Publication Data
US 2018/0134202 A1 May 17, 2018

Related U.S. Application Data

(60) Provisional application No. 62/421,927, filed on Nov. 14, 2016.

(51) Int. Cl.
B60P 3/025 (2006.01)
B62K 3/00 (2006.01)
B60P 3/00 (2006.01)
A23G 9/04 (2006.01)
A23G 9/44 (2006.01)
B62K 7/00 (2006.01)
A23G 9/28 (2006.01)
B62K 5/02 (2013.01)

(52) U.S. Cl.
CPC ............ B60P 3/0257 (2013.01); A23G 9/045 (2013.01); B60P 3/007 (2013.01); A23G 9/28 (2013.01); A23G 9/44 (2013.01); B62K 5/02 (2013.01); B62K 7/00 (2013.01)

(58) Field of Classification Search
CPC .......... A23G 9/045; A23G 9/225; A23G 9/28; B60P 3/007; B60P 3/0257; B60P 3/20; B62K 5/02; B62K 5/027; B62K 7/00; B62K 7/04
USPC .......................................................... 296/22
See application file for complete search history.

(56) References Cited

U.S. PATENT DOCUMENTS

D259,034 S    4/1981  Mosley, Jr.
8,157,136 B2  4/2012  Lamb et al.
(Continued)

FOREIGN PATENT DOCUMENTS

DE    203 07 189 U1      9/2003
DE    20307189 U1  *  9/2003  .............. B60P 3/025
WO    2018089958 A1      5/2018

OTHER PUBLICATIONS

Four Types of Cycling in Belize, Darryl, 2011, located at http://lovingthebike.com/sun/four-types-of-cycling-in-belize; retrieved via an internet search. (Year: 2011).*
(Continued)

Primary Examiner — Jason S Daniels
(74) Attorney, Agent, or Firm — Terrence J. Edwards; TechLaw Ventures, PLLC

(57) ABSTRACT

Systems, methods, and devices for providing a pre-packaged frozen confection. The system includes a vehicle comprising three wheels, an ice chest secured to the vehicle, and a toppings dispenser attached to at least one of the vehicle or the ice chest. The toppings dispenser includes at least one receptacle configured for holding a liquid topping, a housing attached to at least one of the vehicle or the ice chest, and a spout in fluid communication with the receptacle.

22 Claims, 11 Drawing Sheets

(56) References Cited

U.S. PATENT DOCUMENTS

| | | | | |
|---|---|---|---|---|
| 2002/0180228 | A1* | 12/2002 | Poarch | A47B 83/02 |
| | | | | 296/22 |
| 2004/0245745 | A1* | 12/2004 | Vasser | B62K 3/005 |
| | | | | 280/282 |
| 2006/0273604 | A1* | 12/2006 | Luthe | A47J 31/4403 |
| | | | | 296/22 |
| 2015/0166089 | A1 | 6/2015 | Rupp | |

OTHER PUBLICATIONS

Smowie Flavor Station—Counter Top, as existed on Oct. 29, 2015; located at https://snowie.com/product/counter-top-flavor-station/; retrieved via Internet Archive Wayback Machine. (Year: 2015).*

Elcold Mobilux, as existed Apr. 8, 2015, located at https://www.refrigeration-freezers.com/ri-fridges/12v-battery-powered-portable-freezer/mobilux---12-volt-/B1BAFCCE-DF6C-74FC-89BE11BB24D75E70#; retrieved via INternet Archive Wayback Machine. (Year: 2015).*

English tranlsation of DE 20307189; retrieved May 16, 2019 via PatentTranslate located at www.epo.org. (Year: 2019).*

"Four Types of Cycling in Belize" (DARRYL) Jun. 24, 2011 (Jun. 24, 2011); retrieved from internet Mar. 13, 2018; <http://lovingthebike.com/sun/four-types-of-cycling-in-belize>; entire document, especially Fig. 4 para [0008].

"Mighty Max Cart Sports Fishing and Utility Cart, 400 Lb Capacity" (Mighty Max Cart) Oct. 6, 2016 (Oct. 6, 2016); retrieved from internet Feb. 13, 2018; <https://www.amazon.com/Mighty-Max-Cart-Fishing-Capacity/dp/B009RBW9CU>; entire document, especially Fig. 1.

"Truck Freezers" (Nelson Manufacturing Company) Oct. 24, 2008 (Oct. 24, 2008); retrieved from internet Aug. 13, 2018; <https://web.archive.org/web/20081024232120/http://www.cnelson.com/truck-freezers>; entire document, especially para [0001], [0002]-[0003].

"Counter-Top Flavor Station" (Snowie) May 3, 2013 (May 3, 2013); retrieved from the internet Mar. 13, 2018; <https://snowie.com/product/counter-top-flavor-station/>; entire document, especially Fig. 1; Product Description para [0001].

"The Snow Cone Business" (Bimrock Online) Aug. 3, 2015 (Aug. 3, 2015); retrieved from internet Mar. 13, 2018; <https://www.youtube.com/watch?v=aKWmSQjsxz8>; entire document, especially 0:43-0:52.

"Come Visit Snowie at the IAAPA Attractions Expo 2016" (Jason) Nov. 15, 2016 (Nov. 15, 2016); retrieved from internet Mar. 13, 2018; <https://snowie.com/news/come-visit-snowie-iaapa-attractions-expo-2016/>; entire document, ?especially Fig. 1.

"Determining the Regulatory Status of a Food Ingredient" (U.S. Food & Drug Administration) Mar. 21, 2013 (Mar. 21, 2013); retrieved from internet Mar. 13, 2018; <https://web.archive.org/web/20130321053954/https://www.fda.gov/Food/IngredientsPackagingLabeling/FoodAdditivesIngredients/ucm228269.htm>; entire document, especially para [0003].

United States Patent and Trademark Office, "International Search Report", dated Apr. 16, 2018, International Application No. PCT/US2017/061423.

* cited by examiner

METHODS AND SYSTEMS FOR PREPARING, PACKAGING, AND DISTRIBUTING A FROZEN CONFECTION

CROSS-REFERENCE TO RELATED APPLICATIONS

This application claims the benefit of U.S. Provisional Patent Application No. 62/421,927 filed on Nov. 14, 2016, which is incorporated by reference herein in its entirety, including but not limited to those portions that specifically appear hereinafter, the incorporation by reference being made with the following exception: In the event that any portion of the above-referenced application is inconsistent with this application, this application supersedes said above-referenced application.

FEDERALLY SPONSORED RESEARCH DEVELOPMENT

Not applicable.

BACKGROUND

The disclosure relates generally to methods, systems, and devices, for preparing, packing, and distributing a frozen confection, such as a shaved ice dessert or a snow cone. The disclosure relates to packaging an ice-based dessert for later distribution or consumption. The disclosure relates to methods, systems, and devices for distributing and flavoring an ice-based dessert.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups. Dispensing the syrups as toppings to a usually unflavored ice product can be time consuming for workers. Additionally, most customers desire different levels or amounts of toppings or flavoring syrups. Thus, it is advantageous to make topping dispensers available for customer use such that a customer can flavor the base ice product themselves.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all these matters form part of the prior art base, or were common general knowledge in the field relevant to the disclosure as it existed before the priority date of each claim of this disclosure.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified.

Advantages of the disclosure will become better understood with regard to the following description and accompanying drawings where.

DETAILED DESCRIPTION

Figure 1:
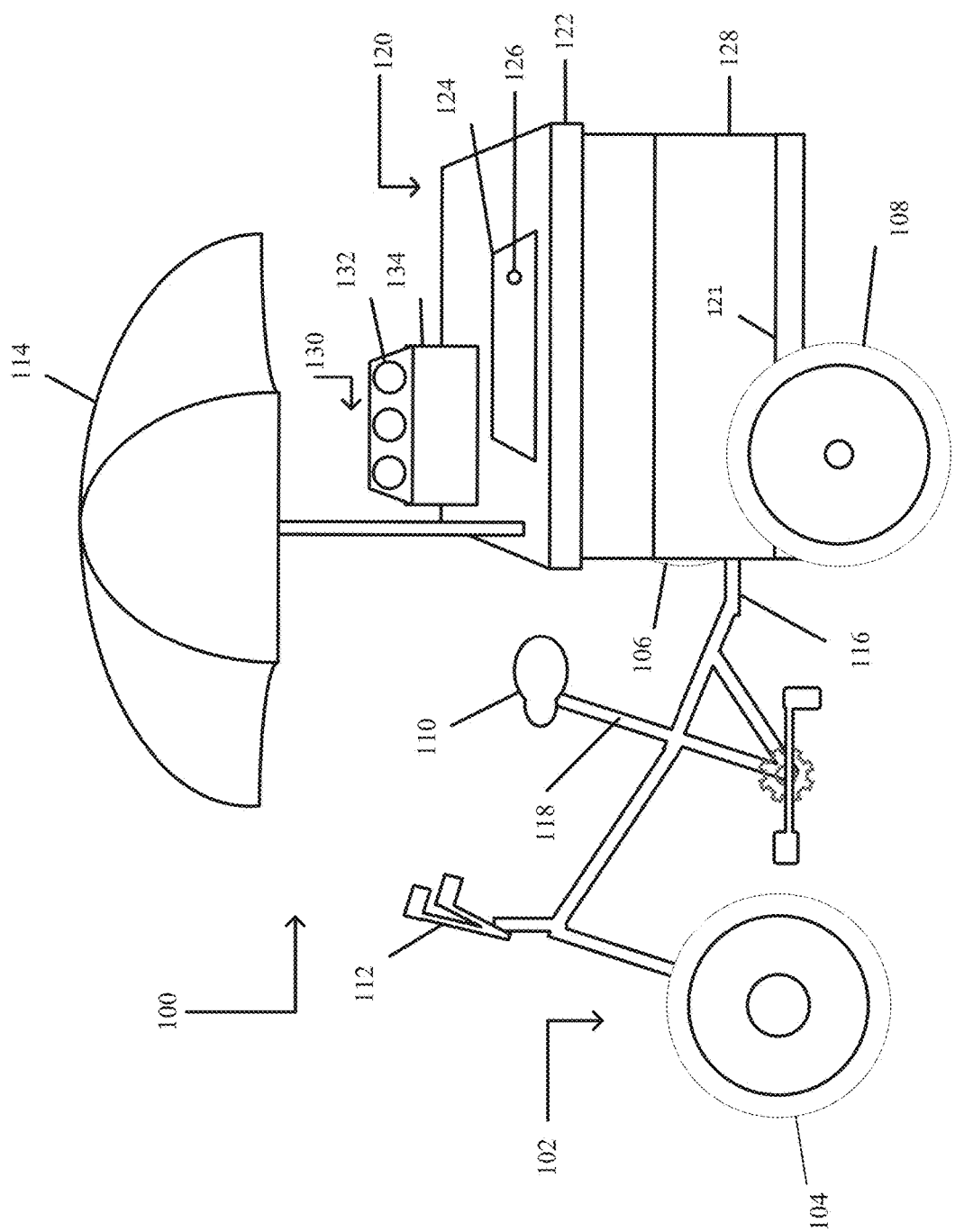
FIG. 1 illustrates a side view of an implementation of a mobile frozen confection system made in accordance with the teachings and principles of the disclosure.

The disclosure extends to methods, systems, and devices for producing and packaging a shaved ice or snow cone product and delivering the packaged product from a mobile frozen confection system. In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems and devices for producing, packaging, and dispensing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the terms "shaved ice" and/or "snow cone" refer broadly to the large family of ice-based desserts or confections made from the fine shavings of ice to form light, fluffy, finely textured ice or finely crushed ice. It will be appreciated that shaved ice and/or snow cones may often include a flavoring that may be a syrup or other sweetened condiment that is added to the shaved ice or snow cone. Similarly, the terms "ice shaving" or "snow cone" in reference to a machine are intended broadly to include all machines used to make or produce the large family of ice-based desserts or confections that may be classified as shaved ice or snow cone products.

In the frozen confection industry, it is common for vendors to sell confections at many locations from within a venue where access is limited, such that full sized vehicles are not practical. In other areas, there is simply insufficient space for a permanent building or other large vehicle or structures from which to sell confections. Accordingly, a mobile frozen confection system that can be moved within a venue or limited space area by one or two users is desirable. In addition, one that could be deployed quickly would give vendors an advantage in meeting demand as events change at a venue, or as venues themselves change.

Further in the frozen confection industry, ice-based desserts such as shaved ice or snow cone products are commonly prepared on-site immediately prior to dispensing to consumers. On-site preparation of shaved ice presents several problems in the industry. Shaved ice can be time-consuming to prepare and can require significant energy that may be particularly limited when not connected to a continuous power source. That is, much of the time spent in selling and dispensing shaved ice desserts is lost in the real-time preparation of the dessert. Further, on-site preparation of shaved ice desserts introduces a number of conditions that must be met as required by health code laws. Many of these conditions may be obviated at the time of selling the dessert to the consumer if the dessert is prepared beforehand according to health code laws. Accordingly, a system and method for advance preparation and suitable storage of ice-based desserts is desirable. In addition, a system and method for prepackaging and storing ice-based desserts may simplify the necessary conditions that must be met at the time of distribution and may greatly reduce the time required to sell and distribute ice-based desserts.

Figure 2:
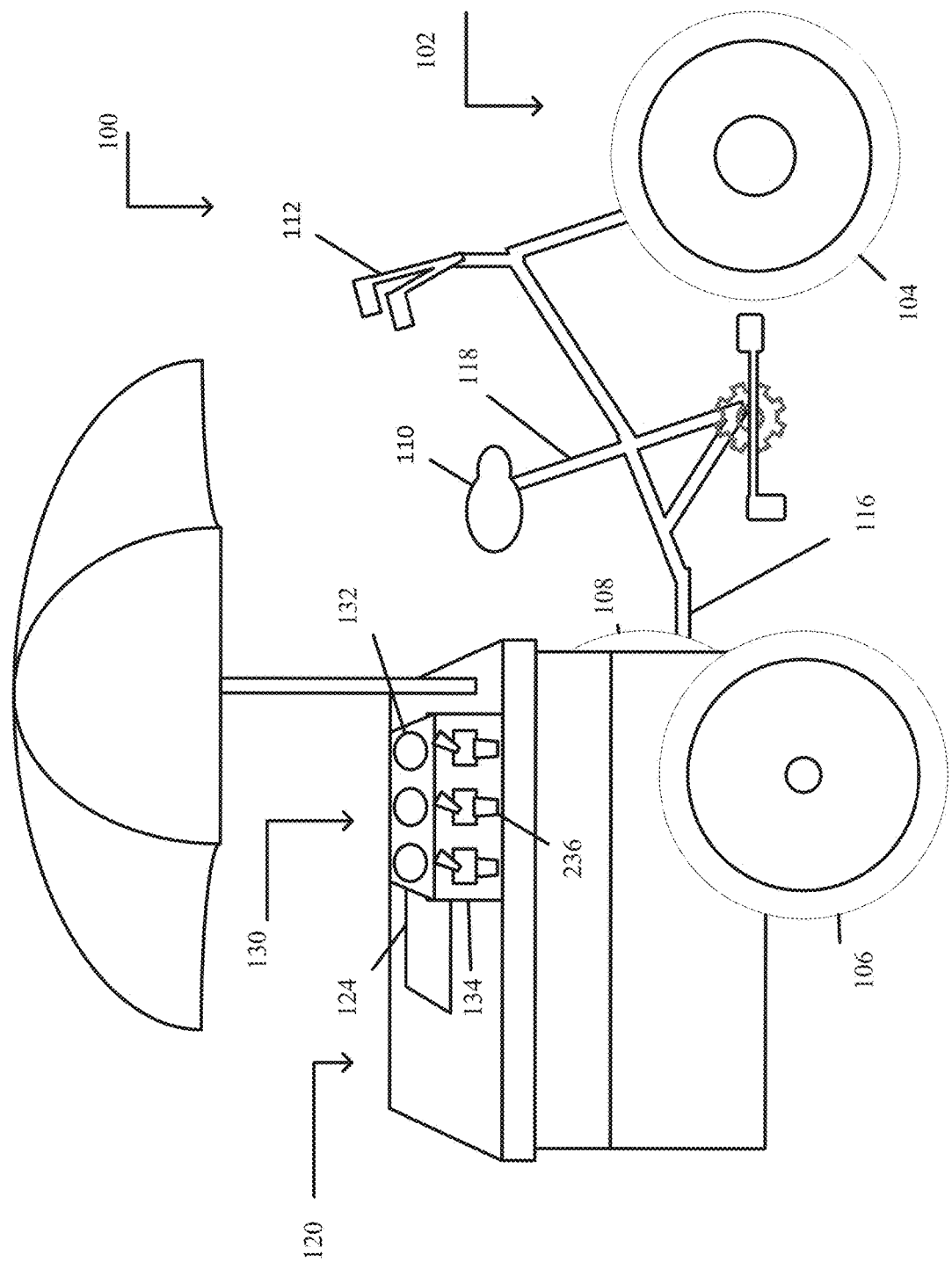
FIG. 2 illustrates a side view of an implementation of a mobile frozen confection system made in accordance with the teachings and principles of the disclosure.

Referring to FIGS. 1-2, opposing side views of an embodiment of a mobile frozen confection system 100 is shown. The system 100 enables a user to store ice-based desserts, such as shaved ice or snow cones, without sacrificing the quality of the dessert. In the frozen confection industry, ice-based desserts are commonly prepared on-site because such desserts can lose the desired texture when subject to some freezing conditions or when subject to improper treatment or storage conditions. Particularly with ice-based desserts, such as snow cones, the texture of the ice-based dessert may be undesirable if the dessert is exposed to a warmer temperature at any time during or after production. As such, it is important to store ice-based desserts at a freezing or near-freezing temperature to avoid a deterioration in texture and consumability. A mobile frozen confection system 100 as disclosed may enable a user to properly store a premade ice-based dessert for later distribution to consumers.

Illustrated in FIG. 1 is a side view of a vehicle 102 with an attached ice chest 120 for storing frozen confections. The ice chest 120 includes an opening 124 for accessing the frozen confections stored therein. In one embodiment there is also a toppings dispenser or dispensing system 130 attached to the ice chest 120. The mobile frozen confection system 100 may further include an umbrella 114 or other implement for attracting customers or providing comfort for customers, such as a shade umbrella. The mobile system 100 may further include advertising or brand placement on, for example, the umbrella 114 or the ice chest 120.

It should be appreciated that the mobile frozen confection system 100 may include any suitable form of vehicle 102. As illustrated in FIG. 1, the vehicle 102 may include a pedal cycle. The vehicle 102 may be human powered with pedals, a sprocket, chain, belt, or direct drive axle for driving one or more wheels when a human physically rotates the pedals. The vehicle includes a plurality of wheels 104, 106, 108. The vehicle 102 may include a seat 110 and a steering mechanism 112 (such as handle bars). In an embodiment where the vehicle 102 includes three wheels, the ice chest 120 may be secured between a first rear wheel 106 and a second rear wheel 108. In an embodiment where the vehicle 102 includes four wheels, the ice chest 120 may be secured between the first rear wheel 106 and the second rear wheel 108. In one embodiment, the vehicle 102 includes a bicycle having two wheels or a pedal cycle having four wheels. In an implementation, the vehicle 102 includes a wagon, a cart, or any other suitable human-powered device. In one embodiment the vehicle 102 is motorized and may include, for example, a motorcycle, a scooter, a moped, a go-kart, an all-terrain vehicle or other motorized device. In one embodiment the vehicle may include a vehicle, including, for example, an automobile, a truck, a bus, or a van. In one embodiment the vehicle 102 includes a strap system such that a user may carry the ice chest 120 on his person. In such an embodiment, straps may be attached to the ice chest 120 and the straps may be configured to be comfortably worn by a person. The person may then wear the ice chest 120 on his person and quickly and efficiently access the frozen confections stored therein.

In an embodiment the vehicle 102 includes an ice chest connection member 116 and a seat frame member 118. The seat frame member 118 may be part of a vehicle frame that is straddled by a user during riding/driving of the vehicle 102. The ice chest connection member 116 may be attached to a platform 121 disposed between two of the at least three wheels 106, 108. The ice chest connection member 116 may be attached to the platform 121 by any suitable means known in the art including, for example, welded, chained, tied, hitched with a ball mount or other suitable mount, and so forth. The ice chest 120 may be secured to the platform 121 by any suitable means known in the art including, for example, secured with screws or nails, held down with tension cable or cording, welded to the platform 121 and so forth. In an embodiment the ice chest connection member 116 is welded to the vehicle 102 frame. In an embodiment the ice chest connection member 116 is removably attached to the vehicle 102 frame. In an embodiment the seat frame member 118 supports a seat 110 of the vehicle 102. The seat frame member 118 is attached to a vehicle 102 body frame as shown in FIGS. 1-2.

It should further be appreciated that the ice chest 120 itself may also comprise the vehicle 102. That is, there may be wheels attached to the ice chest 120 such that it can be pushed or pulled while a user is walking on-foot. The ice chest 120 may also be motorized or may be pulled by a motorized device to aid or assist in locating the ice chest 120. Alternatively, the ice chest 120 may comprise, for example, a bag or a backpack that may be worn by a person. It should be appreciated that the ice chest 120 need not include a rigid cooler or refrigerator as illustrated in FIG. 1. The ice chest 120 may be constructed such that it is easily transported by a user without a separate vehicle or vehicle 102 as illustrated in FIG. 1.

In an implementation, the vehicle 102 enables a person to bring the mobile frozen confection system 100 into locations that other frozen confection dispensers cannot go. For example, frozen confections are commonly sold from, for example, a large vehicle or a small building-like structure. A smaller vehicle 102, such as a pedal cycle, a scooter, or a strap system, may be taken into, for example, buildings, parks, sporting events, and entertainment events. This can greatly increase the efficiency in dispensing frozen confections to large numbers of people in hard-to-access locations.

The ice chest 120 may include an insulated container such as a cooler or an icebox. The ice chest 120 may include an insulated container comprising a freezable fluid within the walls of the container, such that the ice chest 120 may be frozen to maintain a cool interior temperature. The ice chest 120 may include a powered refrigerator or freezer. The refrigerator or freezer may be powered by, for example, batteries, a generator, solar energy panels, or any other suitable power source. The ice chest 120 may further include a cart, a crate, a box, or a bag. The container may include, for example, a frozen fluid or solid carbon dioxide, i.e. "dry ice," for maintaining a cool temperature within the ice chest 120. In an implementation, the ice chest 120 includes a rigid cooler with ice, dry ice, or another suitable frozen fluid contained therein such that the interior of the storage container is maintained at a cool temperature. In an implementation, the ice chest 120 includes a refrigerator or freezer powdered by, for example, solar panels, batteries, or a generator. In an implementation, the ice chest 120 includes a rigid cooler comprising a freezable fluid disposed within the walls of the cooler. The entire cooler may be pre-frozen such that the freezable fluid can freeze and maintain a cool interior temperature without requiring the use of, for example, ice or dry ice within the interior of the ice chest 120.

The opening 124 to the ice chest 120 may include a door and a door handle 126. The door may hinge open or slide open. The opening 124 may comprise an entire surface of the ice chest 120 or it may comprise a portion of a surface of the container as shown in FIG. 1. The opening 124 may be constructed of an insulating material and it may be constructed of a translucent material such that the interior of the ice chest 120 may be seen when the opening 124 is closed.

In an implementation as show in FIG. 1, the ice chest 120 includes an ice chest casing 128 and an upper lid 122. The ice chest casing 128 may be attached to the vehicle, for example between two of the vehicle wheels 106, 108 as depicted in FIG. 1. The ice chest 120 may further include an ice chest insert (not shown) that may be removably inserted into the ice chest casing 128. The upper lid 122 may be attached to the ice chest casing 128 after an ice chest insert (not shown) is inserted into the ice chest 120. In such an implementation the ice chest insert (not shown) may be separately frozen or cooled before inserting into the ice chest casing 128 that is affixed to the vehicle 102. The ice chest (insert) may comprise, for example, a liquid in the walls of the insert configured to be frozen and to hold a cool temperature for an extended period.

The toppings dispenser 130 may be attached to, for example, the vehicle 102, the ice chest 120, the upper lid 122, or it may stand alone apart from the mobile system 100. The toppings dispenser 130 may include a selection of toppings for flavoring an ice-based confection including liquid flavored toppings. The toppings dispenser 130 may be made accessible to consumers such that a consumer may select the desired topping and the amount of topping, and the consumer may have ample time to select a topping after receiving the frozen confection. Providing consumers access to the toppings dispenser 130 can create freedom an efficiency in the dispensing of frozen confections such that consumers may select the flavor and amount of toppings and multiple consumers may be serviced at a single time. Alternatively, the toppings dispenser 130 may be made accessibly only to a person operating the mobile frozen confection system 100 such that consumers do not have access to the toppings dispenser 130.

In an implementation the toppings dispenser 130 includes a plurality of receptacles 132 inside a housing 134. The housing may be attached to any of the ice chest 120 or the vehicle 102, or it may alternatively be a stand-alone station, or it may be strapped to a person with, for example, a backpack. In an embodiment the toppings dispenser 130 dispenses flavored liquid toppings such as liquid toppings suitable for a snow-cone or other snow-based frozen confection.

The umbrella 114 or other attraction device may be attached to, for example, the vehicle 102, the ice chest 120, or it may stand alone apart from the mobile frozen confection system 100. The umbrella 114 may be suitable for shading the mobile system 100 and a surrounding area from the sun or inclement weather. The umbrella 114 may further include, for example, a fan or a water misting system. In an implementation, the umbrella 114 includes a canopy. In an implementation, the umbrella 114 includes a stand-alone structure that may be temporarily set up and collapsed after use.

It should be appreciated that the mobile frozen confection system 100 may include, for example, advertisements, logos, or other marketing materials on any portion of the system. In an implementation, the type of frozen confection is displayed on at least one of the vehicle 102, the ice chest 120, and the umbrella 114.

Referring to FIG. 2, there is illustrated a side view of an embodiment of a mobile frozen confection system 100. The system 100 includes a vehicle 102, an ice chest 120, and a toppings dispenser 130. The toppings dispenser 130 includes a housing 134 for holding at least one jug, container, or another receptacle 132. The toppings dispenser 130 includes at least one spout 236 for dispensing a topping such as liquid flavoring. As illustrated, the toppings dispenser 130 comprises a plurality of spouts 236, such that more than one frozen confection product may be flavored at a time.

In an embodiment as disclosed in FIGS. 1-2, the toppings dispenser 130 is attached to a top of the ice chest 120. The toppings dispenser 130 is configured to provide a user access to a spout 236 or a receptacle 132 of the toppings dispenser 130. In such an embodiment the toppings dispenser spouts 236 may face outward with respect to the vehicle 102 such that a user may stand at a side of the vehicle 102 and activate a spout 236. For example, the toppings dispenser 130 may include spouts 236 that face towards a side of the vehicle at about weight or chest height for a child or adult. The spouts may be positioned near a side of the vehicle so that excess topping falls on the ground and/or so that a user need not reach far to actuate a spout.

The mobile frozen confection system 100 increases efficiency in providing frozen confections to consumers and it further improves customer satisfaction. The toppings dispenser 130 provides a means for consumers to apply a flavoring topping to a frozen confection on their own. The consumers may select the desired flavor combination and amount of flavoring for their own frozen confection. Further, the toppings dispenser 130 permits a plurality of consumers to apply a flavoring topping to their frozen confections while other consumers are purchasing and receiving their frozen confection. The mobile frozen confection system 100 shortens the overall transaction time for providing frozen confections to consumers.

Figure 3:
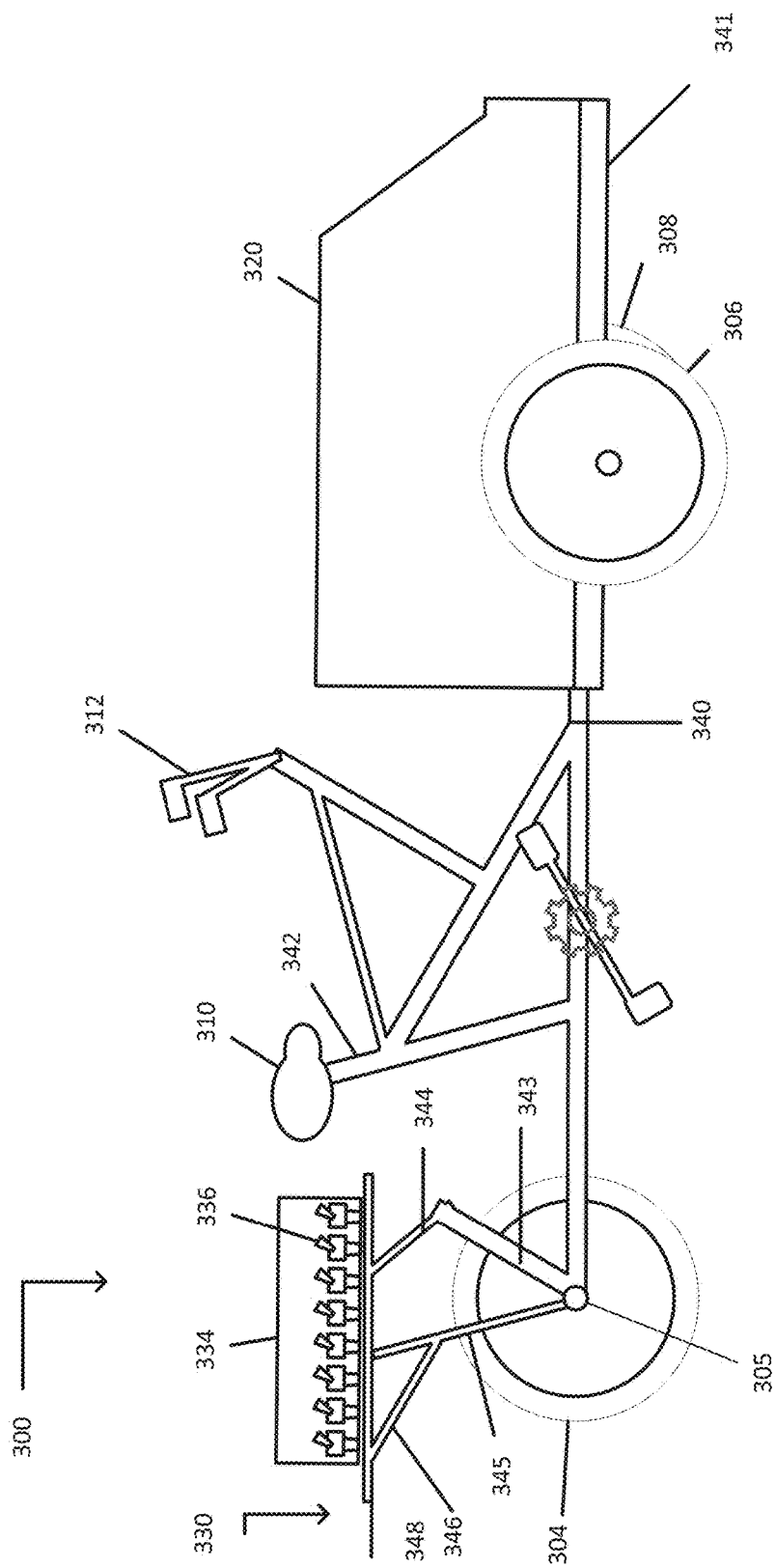
FIG. 3 illustrates a side view of an implementation of a mobile frozen confection system made in accordance with the teachings and principles of the disclosure.
Figure 4:
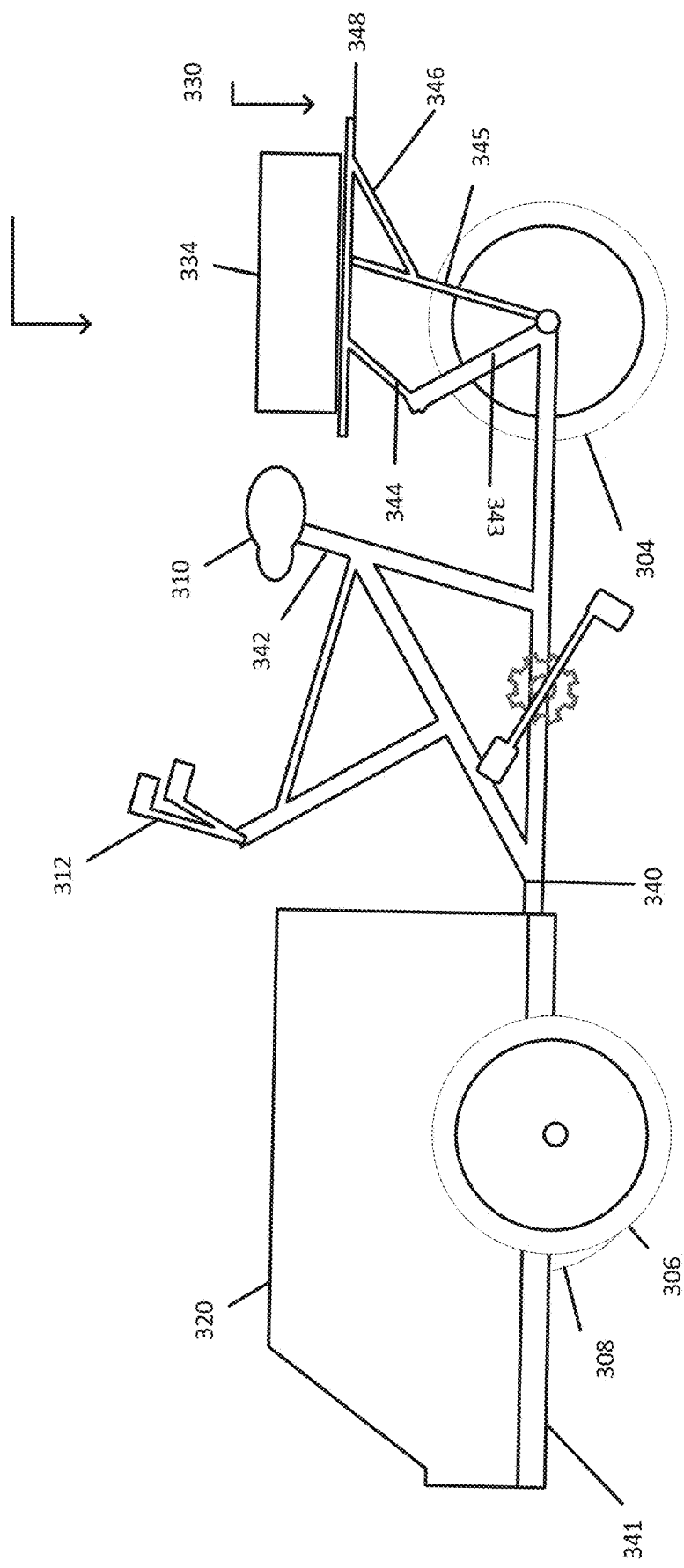
FIG. 4 illustrates a side view of an implementation of a mobile frozen confection system made in accordance with the teachings and principles of the disclosure.
Figure 5:
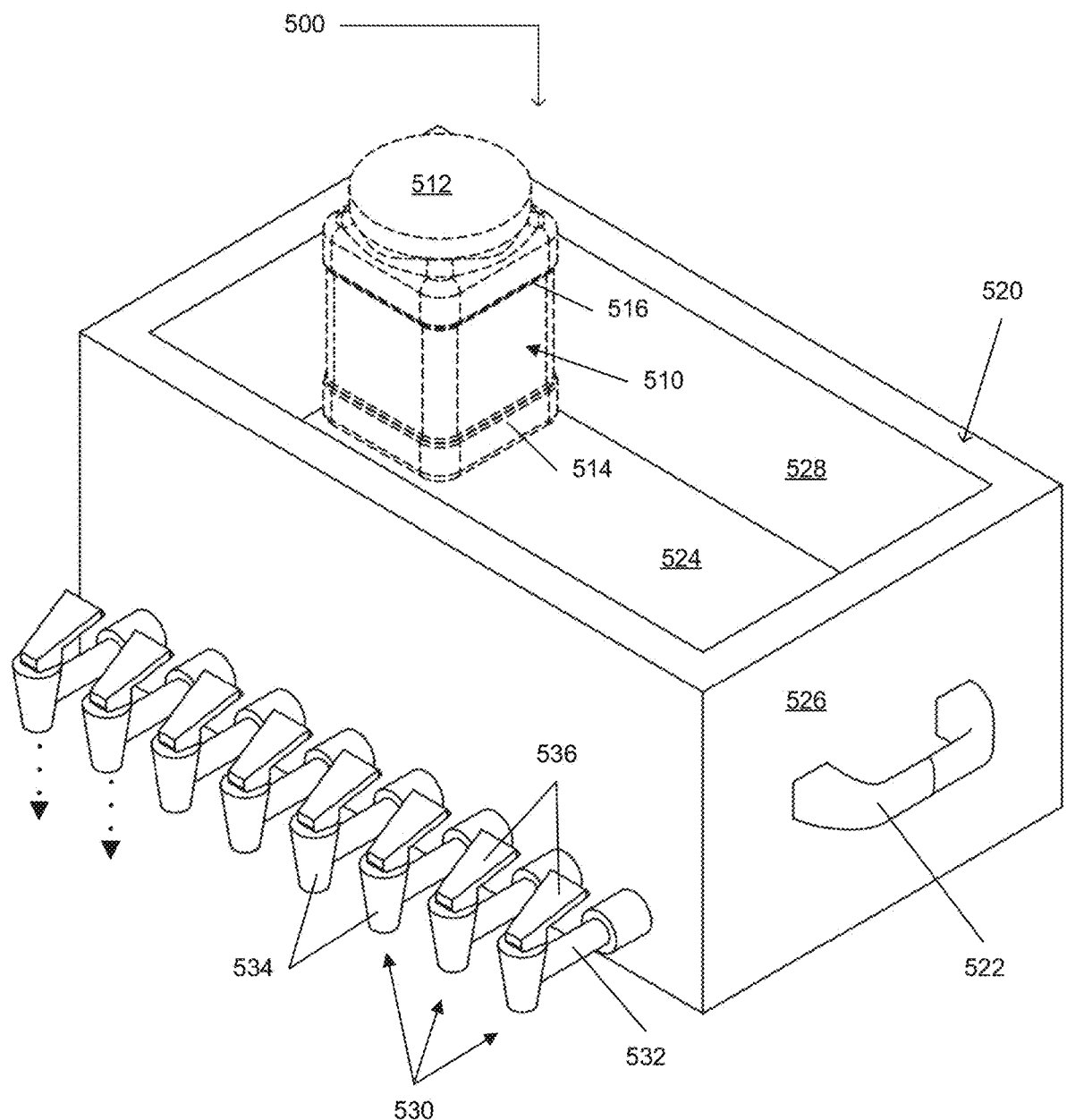
FIG. 5 illustrates an aerial perspective view of an implementation of a toppings dispenser used with or without the mobile frozen confection system and made in accordance with the teachings and principles of the disclosure.

Referring to FIGS. 3-4, there is illustrated opposing side views of an embodiment of a mobile frozen confection system 300. The mobile system 300 includes a vehicle 302, an ice chest 320, and a toppings dispenser 330. The vehicle 302 includes a seat 310 and a steering mechanism 312. The vehicle 302 includes a first front wheel 306 and a second front wheel 308 along with a rear wheel 304. In the embodiment depicted in FIGS. 3-4 the ice chest 320 is attached to the vehicle 302 between the first front wheel 306 and the second front wheel 308. The vehicle 302 further includes an ice chest platform 341 attached to the vehicle 302 via an ice chest connection member 340. The vehicle 302 includes a toppings dispenser platform 348 configured for supporting and/or securing a toppings dispenser 330. The toppings dispenser platform may be attached to the vehicle 302 and supported by a first platform support 343, a second platform support 344, a third platform support 345, and a fourth platform support 346.

The toppings dispenser 330 includes a housing 334 and a plurality of spouts 336. The vehicle 302 may further include a toppings dispenser platform 348 configured to support and secure the toppings dispenser 330. In an embodiment, the housing 334 is secured to the toppings dispenser platform 348 and a plurality of receptacles (see FIGS. 1-2) may be stored in the housing 334. The housing 334 may be secured or attached to the toppings dispenser platform 348 by any suitable means known in the art including, for example, welded, attached with screws or nails, attached by tension with flexible or non-flexible cords, clipped on, and resting on the platform 348. In an embodiment the housing 334 is attached to the toppings dispenser platform 348 in the middle of the platform 348 relative to the vehicle 302 such that the mass of the housing 348 does not create an imbalance in the vehicle's 302 center of gravity.

In an embodiment the toppings dispenser platform 348 is supported by a plurality of platform support members 343, 344, 345, 346. The platform support members 343, 344, 345, 346 may be rigidly affixed to the vehicle 302 frame or may be removably attached to the vehicle frame. In an embodiment the platform support members 343, 344, 345, 346 are directly or indirectly attached to a wheel hub 305 disposed in the center of a wheel 304. The wheel hub 305 is attached to a frame of the vehicle 302 and is configured to secure the wheel 304 to the vehicle 302. In an embodiment two platform support members 343, 345 are affixed directly to the wheel hub 305 and two platform support members 344, 346 are affixed to a different platform support member and the platform 348 as shown in FIGS. 3-4.

In an embodiment the vehicle 302 includes an ice chest connection member 340 attached or secured to a frame of the vehicle. The ice chest connection member 340 may be affixed to the ice chest platform 341 and may be permanently or removably attached to the vehicle 302. In an embodiment the ice chest connection member 340 splits into a plurality of individual members that are each attached to the ice chest platform 341. In an embodiment the ice chest connection member 340 is a single member attached to the vehicle 302 and the ice chest platform 341. The ice chest 320 may be secured to the ice chest platform 341 by any suitable means known in the art, including welded, attached via screws or nails and the like, attached via tension with flexible cords or other cords, resting on the platform 341, clipped to the platform 341, and so forth.

Each of the platforms 341, 348 may be rigidly affixed or removably attached to the vehicle 302 and provide a platform for either of the ice chest 320 or the toppings dispenser 330 to be attached thereon. The ice chest 320 and the toppings dispenser 330 may be secured to the platforms 341, 348 in any way known in the art, including resting on the platform, attached to the platform by screws, nails, or any other mechanism, or attached to the platform by tension with, for example, ropes or flexible cords.

In an embodiment the ice chest 320 is equipped with a power source. The power source may include any suitable power known in the art, including solar panels, a generator, a battery, a hardline to a non-movable power source, a combination of power sources, and the like. The power source may provide a means to maintain a very low temperature in the ice chest 320. It may be important to maintain a very low temperature in an embodiment where the ice chest 320 is holding ice-based frozen desserts such as snow cones because the texture of an ice-based dessert may deteriorate quickly if the dessert is exposed to warm or moderate temperatures.

Referring now to FIG. 5-8, various views of an implementation of a toppings dispenser 500 are shown. An implementation of the disclosure comprises a toppings dispenser or a dispensing system for providing toppings to a frozen confection such as shaved ice or a snow cone. Toppings may be liquid and/or may be solid pieces configured for dispensing. The toppings dispenser allows a consumer to receive a frozen confection and apply toppings to the frozen confection of the consumer's own choosing. This reduces the wait-time to receive a frozen confection and allows a consumer to select any number of toppings or amount of toppings as desired. It should be appreciated that the toppings dispenser may be constructed in any number of shapes or sizes, and it may be attached to the mobile frozen confection system 100, 300 or it may include a stand-alone structure.

As illustrated in FIGS. 1-4, the toppings dispenser 500 may be attached to the mobile frozen confection system 100, 300 The toppings dispenser may be attached to, for example, the ice chest, the vehicle, a platform, or it may stand alone apart from the mobile frozen confection system.

The toppings dispenser 500 includes at least one receptacle 510 configured for holding a topping such as a flavoring syrup. The receptacle 510 includes a lid 512 that may comprise a hole or air vent to depressurize the receptacle 510 when a topping is dispensed. The toppings dispenser 500 includes a housing 520 having a housing base 524, a housing inner wall 528, and a handle 522. A plurality of spouts 530 are attached to the housing; each of the plurality of spouts 530 includes a housing connection 532, a downspout 534, and a lever 536. The spouts 530 are in fluid communication with the receptacles 510 such that a topping such as a flavored syrup may be stored in a receptacle 510 and dispensed from a spout 530.

In an embodiment, each of the receptacles 510 stores a different topping. In another embodiment, some or all of the receptacles 510 store the same topping. The toppings may comprise, for example, flavored syrup in a suitable viscosity or a solid topping configured to be dispensed through the toppings dispenser. The topping may comprise any suitable flavoring or food dye. In an embodiment, the toppings comprise a flavored water-based syrup for flavoring an ice-based dessert.

The housing 520 is configured to hold each of the receptacles 510. The housing 520 may hold any number of receptacles 510, including two, three, four, five, six, seven, eight, nine, ten, eleven, twelve, thirteen, fourteen, or more receptacles 510. It should be appreciated that the housing 520 can be constructed of any suitable material and in any suitable size or shape for housing the at least one receptacle 510. In an implementation the housing 520 is a rectangle and is configured to hold eight receptacles 510 in a 4×2 configuration or orientation. In an implementation the housing 520 is a rectangle and is configured to hold nine receptacles 510 distributed in a square 3×3 configuration or orientation. In an implementation the housing 520 is a rectangle and is configured to hold twelve receptacles 510 distributed in a rectangular 4×3 configuration or orientation.

The plurality of spouts 530 may be attached directly to an exterior of the housing 520. The spouts are configured such that a user may activate the spout 530 to allow for the release of flavoring liquid by manipulating the lever 536. The flavoring liquid may pass through the housing connection 532 and remain stopped before the downspout 534 when the lever 536 is configured to block the flow of the topping. Alternatively, when the lever 536 is configured to allow the flow of the topping, the topping may pass through the downspout 534. A user may further manipulate the rate of flow of the topping by manipulating the degree to which the lever 536 is turned or lifted.

It will be appreciated that the toppings dispenser 500 may include a plurality of spouts and a plurality of receptacles. Each of the plurality of receptacles may include a different flavored syrup or other topping for a frozen confection. In an embodiment, there is a one-to-one correspondence between a spout and a receptacle. In an implementation, there is one receptacle for a plurality of spouts, such that a single receptacle feeds a plurality of spouts. It will be appreciated that in an embodiment, a plurality of receptacles and a plurality of spouts may be located on each side of the toppings dispenser 500. In an implementation, there are two spouts for every one receptacle, such that if there are eight receptacles 510, then there will be 16 corresponding spouts 530.

In an embodiment, a receptacle 510 is in fluid communication with a spout 530. The receptacle 510 and the spout 530 may be connected by a tubing. It should be appreciated that the tubing may be made of any suitable material and it may be flexible. The tubing may be constructed of, for example, a flexible plastic, a rubber, a braided metal, or a non-flexible material. In an embodiment, gravity causes a topping to travel from a receptacle 510 to a spout 530 where the topping may be dispensed. In an embodiment, a pump causes the topping to travel from the receptacle 510 to the spout 530.

In an embodiment, the receptacle 510 includes a minimum fill line 514 and a maximum fill line 516 indicated on the receptacle 510. The minimum fill line 514 may indicate a minimum amount of liquid topping necessary for proper operation of the toppings dispenser 500. The maximum fill line 516 may indicate a maximum amount of liquid topping for proper operation of the toppings dispenser 500.

Figure 6A:
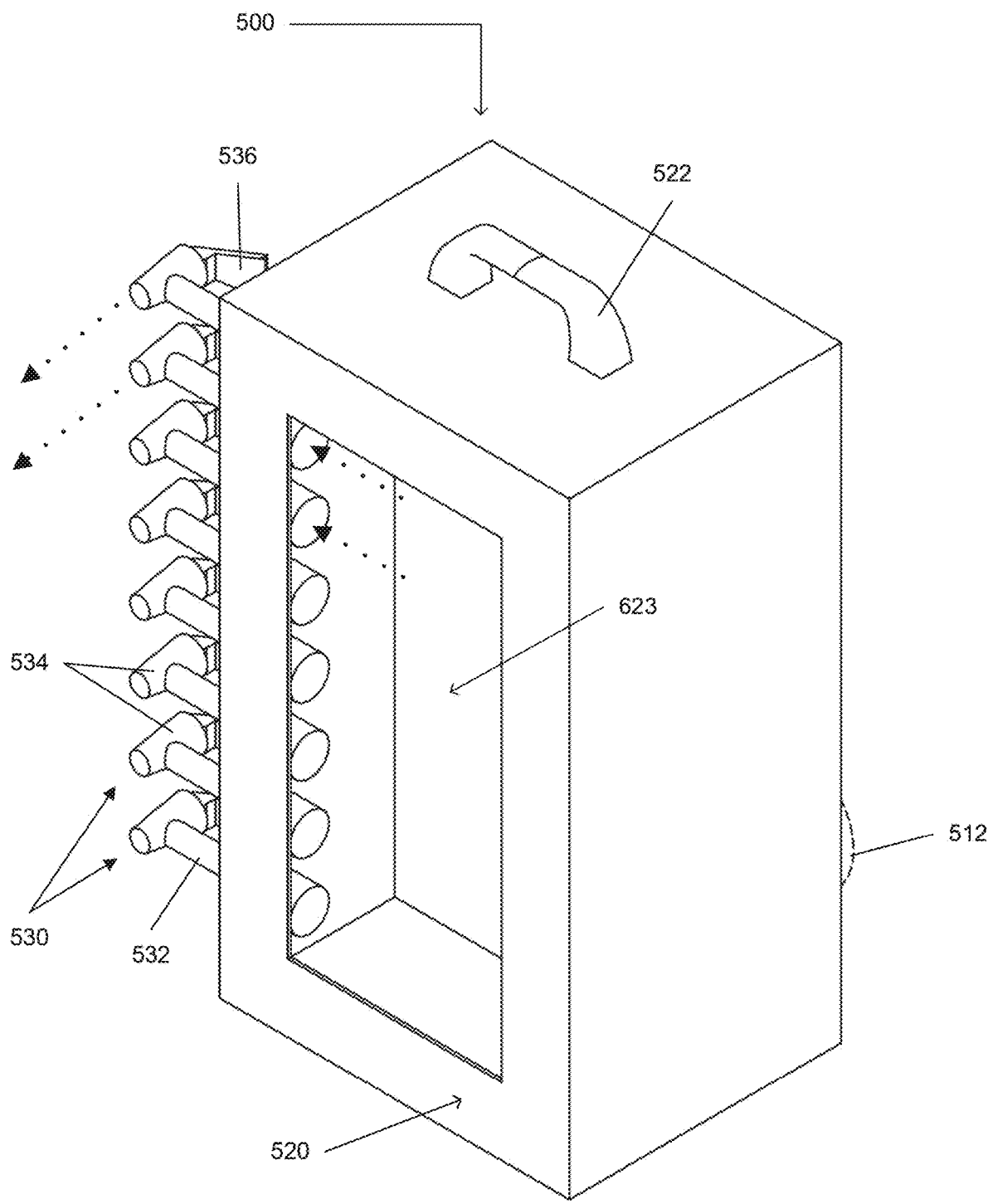
FIG. 6A illustrates an underside perspective view of an implementation of a toppings dispenser made in accordance with the teachings and principles of the disclosure.

Referring to FIG. 6A, an underside perspective view of an embodiment of a toppings dispenser 500 is shown. The toppings dispenser 500 includes a housing 520 having a handle 522. A plurality of spouts 530 are attached to the housing 520. Each of the plurality of spouts 530 includes a housing connection 532, a downspout 534, and a lever 536. In an embodiment a spout 530 is in fluid communication with a receptacle (not shown) having a lid 512. The interior space 523 of the housing 520 is where a receptacle 510 may be housed.

Figure 6B:
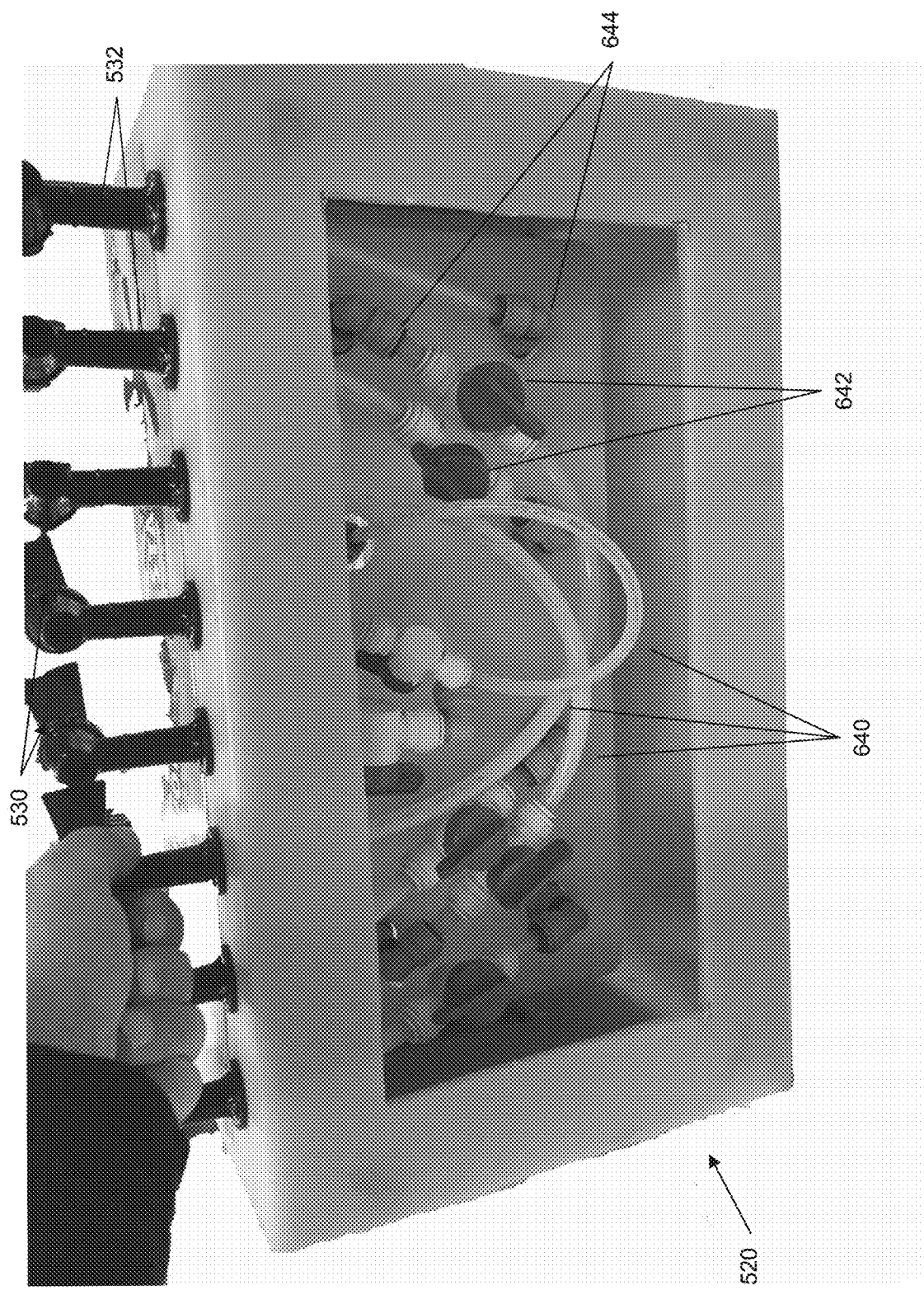
FIG. 6B illustrates an underside perspective view of an implementation of a toppings dispenser made in accordance with the teachings and principles of the disclosure.

Referring to FIG. 6B, an underside view of a toppings dispenser 500 made in accordance with an embodiment of the disclosure is shown. The toppings dispenser 500 includes a plurality of spouts 530 attached to a housing 520. A spout 530 is connected to a tube 640. The tube 640 may include a stopper 642 for blocking or allowing the flow of a fluid in the tube 640. The tube 640 may be connected to the spout 530 on one end and may be connected to a receptacle 510 on the other end. A receptacle connection 644 provides a connection to a receptacle 510 that passes through a housing base 524.

Figure 7:
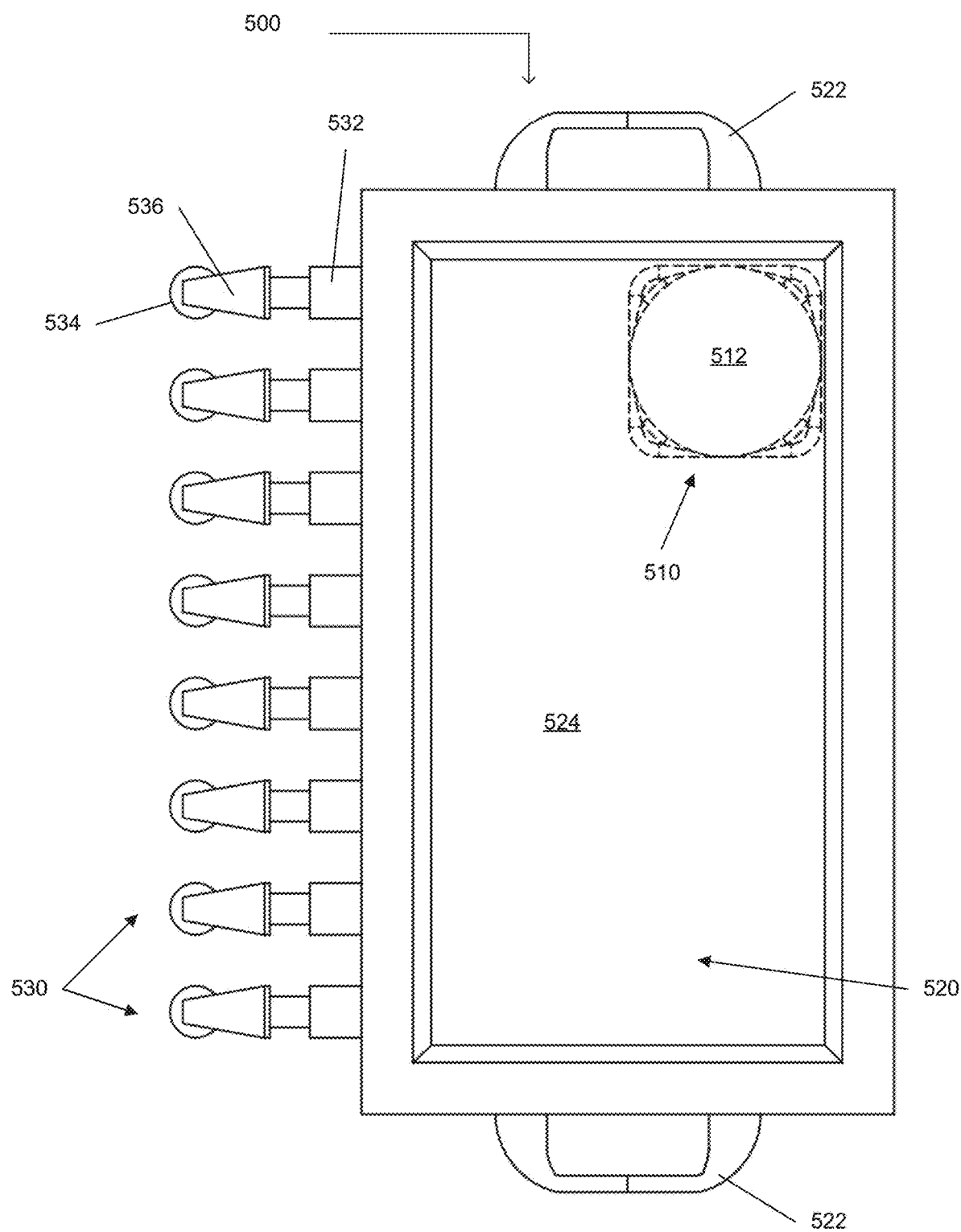
FIG. 7 illustrates an aerial view of an implementation of a toppings dispenser made in accordance with the teachings and principles of the disclosure.

Referring to FIG. 7, an aerial view of a toppings dispenser 500 according to one embodiment is shown. The toppings dispenser 500 includes a housing 520 having a handle 522 and a housing base 524. The toppings dispenser 500 includes at least one receptacle 510 having a lid 512. At least one spout 530 is attached to the housing 520. Each of the at least one spouts 530 includes a housing connection 532, a downspout 534, and a lever 536.

In an embodiment, the housing base 524 is a rigid base comprising a plurality of openings wherein a tubing connection passes through the housing base 524 and enables a fluid connection between a spout 530 and a receptacle 510. In such an embodiment, a tubing connection is connected to a spout 530 at the housing connection 532, passes through the opening in the housing base 524, and is received by an opening in a receptacle 510. In an embodiment, the housing base 524 comprises a rigid base around the outermost edge of the base and is open in the center of the housing base 524 such that a plurality of receptacles 510 may receive a tubing for providing a fluid connection between the receptacle 510 and a spout 530. In an embodiment, the housing base 524 is a solid rigid base.

Figure 8:
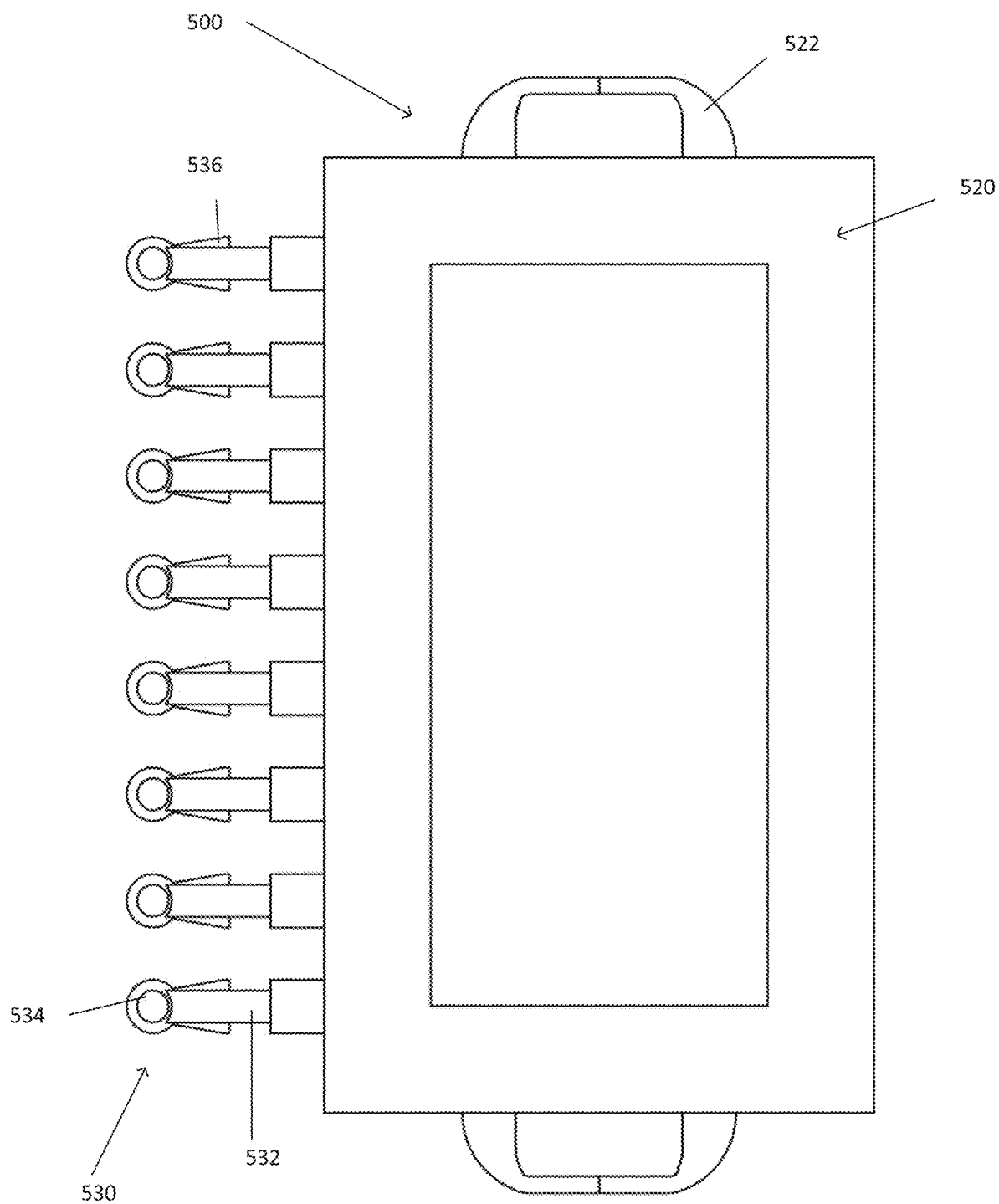
FIG. 8 illustrates an underside view of an implementation of a toppings dispenser made in accordance with the teachings and principles of the disclosure.

Referring to FIG. 8, an underside view of a toppings dispenser 500 according to one embodiment is shown. The toppings dispenser 500 includes a housing 520 having a handle 822. At least on spout 530 is attached to the housing 520 for providing a means to dispense a fluid topping. Each of the at least one spout 530 includes a housing connection 532, a downspout 534, and a lever 536.

Figure 9:
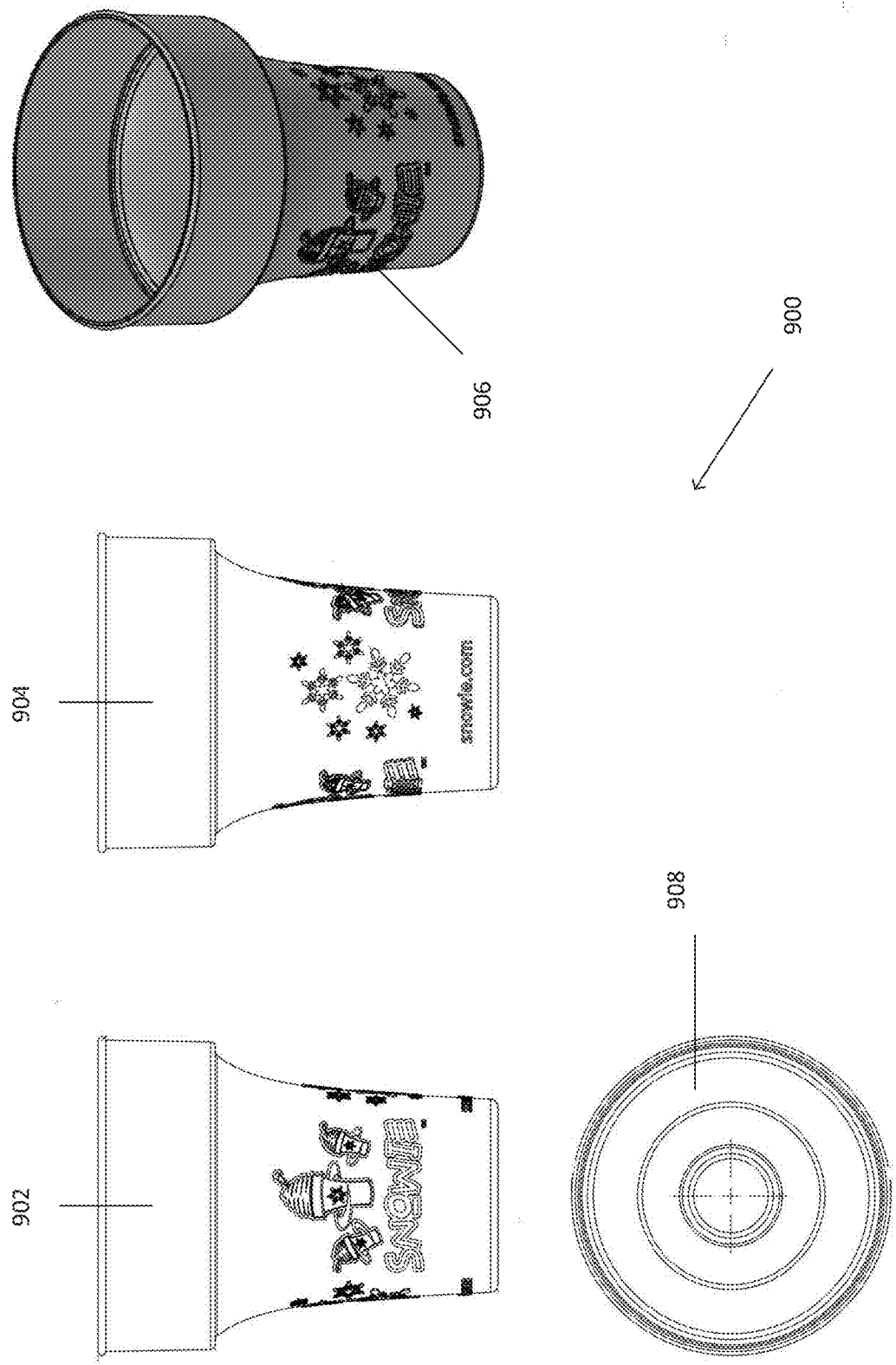
FIG. 9 illustrates various views of an implementation of a cup for holding a pre-packaged frozen confection made in accordance with the teachings and principles of the disclosure.

Referring to FIG. 9, various views and implementations of a frozen confection container 900 are shown. The container comprises a cup 902, 904, 906, 908 and may further comprise a lid (not shown). FIG. 9 depicts a front view of a cup 902, a rear view of a cup 904, an aerial perspective view of a cup 906, and an aerial view of a cup 908.

The cup 902 may be constructed of any suitable material, including any suitable insulating material, a plastic, a paper, or a metal. The cup 902 may be double layered and include a liquid material between the two layers. The liquid material may be frozen before adding a frozen confection to the cup and the liquid material may be configured to hold a cool temperature for an extended period. It should be appreciated that the cup 902 may include any number of logos, designs, or marketing materials 904 imprinted thereon. In an implementation the designs 904 are raised and printed in a variety of colors.

In an implementation, the frozen confection container 900 is airtight such that the dessert is sealed and sanitary, and ready-made as a prepackaged food product. In such an implementation, there are no openings in the lid (not shown) or cup 902 such that no air can get into the container 900. This implementation can be desirable if a user wishes to comply with a health code condition that requires the confection to be entirely sealed. Further, this implementation can be desirable if a user wishes to fully seal the frozen confection to lengthen a possible storage time without sacrificing quality or texture in the frozen confection. In a further implementation, the container 900 is airtight when it is packaged for consumer use and it is airtight when dispensed to a consumer. The container 900 may further include a perforated area such that a consumer may open a portion of the container 900. The consumer may apply a topping to the frozen confection through the opened perforated area, insert a straw or spoon into the opened perforated area for consumption of the dessert, or consume the dessert through the opened perforated area. Alternatively, in an implementation, the frozen confection container 900 is not airtight when it is packaged or distributed to consumers. The container 900 may include, for example, a lid with an open lid cover.

The frozen confection container 900 and the mobile frozen confection system 100, 300 may be desirable when wishing to distribute a great number of ice-based desserts in a short amount of time, for example at an entertainment event or sporting event. Such an implementation may be desirable when wishing to distribute ice-based desserts without preparing the desserts at the distribution site. Further, such an implementation may obviate the need for a distributor to have, for example, a hand-washing sink at the site of distribution because the frozen confections are prepackaged, sealed, and sanitary for consumption without any preparation at the distribution site. That is, the health code requirements for preparing the frozen confection may be satisfied where the confection is prepared offsite from the distribution area. This may enable a distributor to carry or stock the prepackaged ice-based desserts without any equipment for creating the desserts or ensuring the desserts are created in compliance with health code standards.

Figure 10:
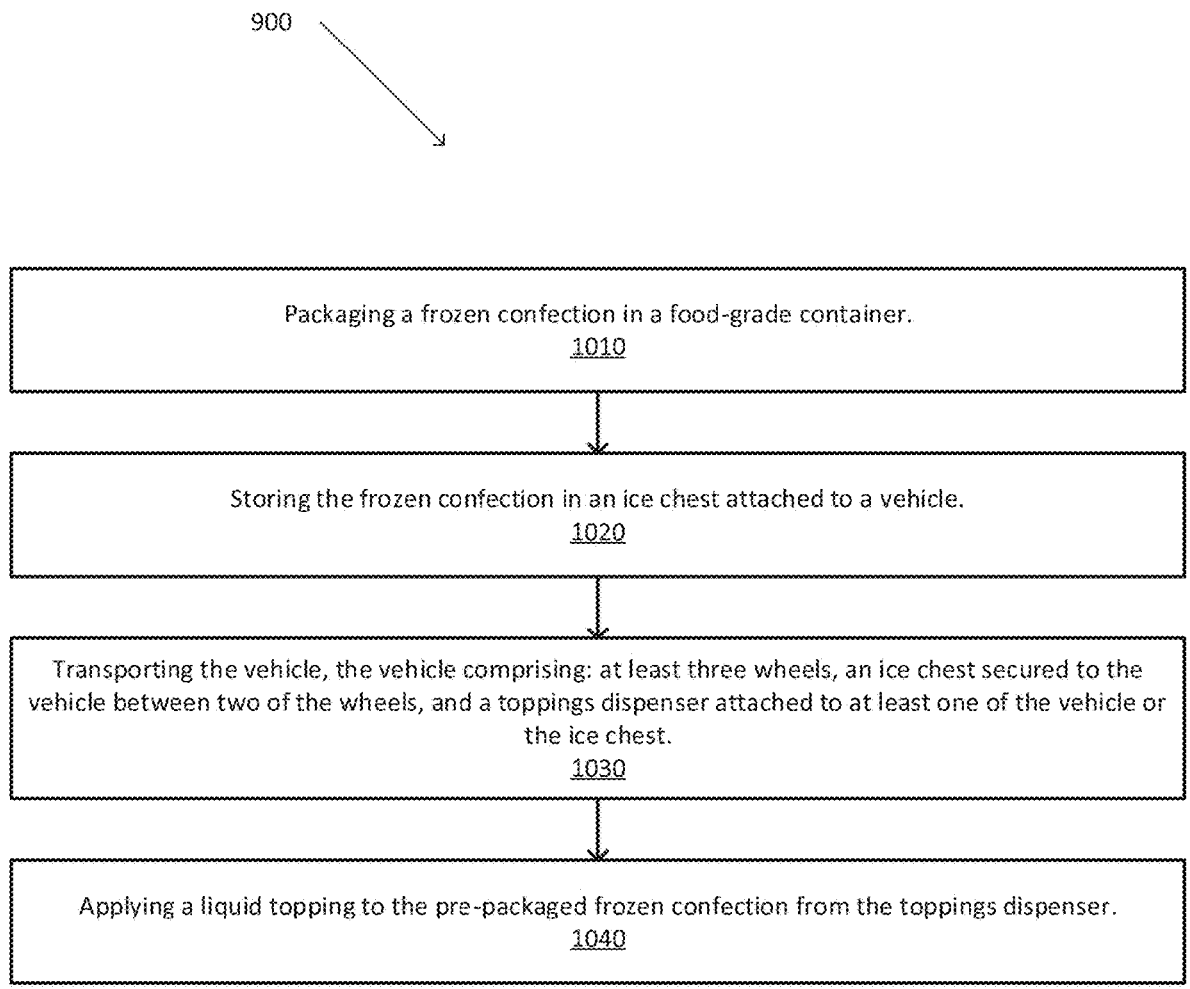
FIG. 10 illustrates a method of providing a pre-packed frozen confection made in accordance with the teachings and principles of the disclosure.

Referring to FIG. 10, a method of providing a frozen confection is shown. The method 1000 begins and a user packages a frozen confection in a food-grade container 1010. The food-grade container may include, for example, a container such as that disclosed in FIG. 9. The container may be vacuum sealed, it may be packed with a lid, or it may be prepared in any other suitable manner that enables the pre-packaged frozen confection to be distributed to a consumer. The method 1000 continues and a user stores the frozen confection in an ice chest attached to a vehicle 1020. The user transports the vehicle 1030. The vehicle comprises at least three wheels, an ice chest secured to the vehicle between two of the three wheels, and a toppings dispenser attached to at least one of the vehicle or the ice chest. The user applies a liquid topping to the pre-packaged frozen confection from the toppings dispenser 1040.

Further to the systems disclosed herein, a method of preparing and storing frozen confections is disclosed. In an implementation, a user prepares an ice-based dessert and packages the dessert for later distribution and consumption. A user produces a shaved ice using, for example, a frozen confection machine for providing conditioned or treated ice for confectionary use. A frozen confection machine may condition or treat ice into a snow-like edible form that may be topped with a topping. The frozen confection machine may be of a type disclosed in U.S. patent application Ser. Nos. 14/605,767; and 14/668,835; and U.S. Pat. No. 8,939,389 (Rupp); U.S. Pat. No. 6,908,053 (Rupp); and U.S. Pat. No. 6,527,212 (Rupp), all of which are hereby incorporated by this reference in their entireties. After producing the shaved ice, a user may store the dessert in a frozen confection container and the container may be sealed such that it is sanitary for distribution and consumption away from the preparation site. The container may be sealed such that the quality and texture of the shaved ice is maintained for an extended period. The shaved ice may be stored in, for example, a freezer connected with a power source or a cooler or icebox. In an implementation, the shaved ice is distributed from a mobile frozen confection system as illustrated in FIGS. 1-4.

The method of preparing and storing a frozen confection disclosed herein may obviate the need to comply with certain health code requirements at the distribution site. For example, where a product for human consumption is prepared, the location must comprise at least a hand washing station and a hand washing antiseptic. However, if the product is prepackaged and sealed for later consumption, the product may be distributed at a location that does not comply with the health code conditions for preparing a consumable good. In an implementation, the frozen confection is safely prepared at a site that complies with all health code requirements and then the confection is packaged and sealed in, for example, a frozen confection container 900. The entire packaged dessert may be quickly and efficiently distributed to consumers later.

In an implementation, the prepackaged dessert is stored in a powered freezer at, for example, a convenience store, a grocery store, a concession stand, a restaurant, or a residential home. In an implementation, the dessert is obtained pre-made and stored in a freezer or cooler. In an implementation, the dessert is prepared onsite and stored in a frozen confection container, for example, in a container as illustrated in FIGS. 4-10. In an implementation, a user may produce a shaved ice or snow cone, store the dessert in a frozen confection container, and store the dessert in a freezer or cooler for a time for later consumption. In an implementation, the prepackaged dessert is stored in a cooler or icebox and distributed from a mobile frozen confection system. In an implementation, the dessert is flavored from a toppings dispenser or a flavoring utensil.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

EXAMPLES

The following examples pertain to further embodiments:

Example 1 is system for dispensing a pre-packaged frozen confection. The system includes a vehicle comprising three wheels, an ice chest secured to the vehicle, and a toppings dispenser attached to at least one of the vehicle or the ice chest. The toppings dispenser includes: at least one receptacle configured for holding a liquid topping, a housing attached to at least one of the vehicle or the ice chest, the housing configured to hold the at least one receptacle, and a spout in fluid communication with the receptacle.

Example 2 is a system as in Example, wherein the ice chest is disposed between two of the at least three wheels of the vehicle.

Example 3 is a system as in any of Examples 1-2, wherein the vehicle further includes: an ice chest connection member and a platform attached to the ice chest connection member and disposed between two of the at least three wheels. The ice chest is secured to the platform and disposed between two of the at least three wheels.

Example 4 is a system as in any of Examples 1-3, wherein the vehicle further comprises a seat and the ice chest is secured to the platform at a backside of the seat.

Example 5 is a system as in any of Examples 1-4, wherein the vehicle further comprises a seat and the ice chest is secured to the platform at a frontside of the seat.

Example 6 is a system as in any of Examples 1-5, wherein the vehicle is a pedal cycle.

Example 7 is a system as in any of Examples 1-6, wherein the vehicle is motorized.

Example 8 is a system as in any of Examples 1-7, wherein the vehicle further includes a wheel hub disposed in a center of one of the at least three wheels, at least one platform support member attached to the wheel hub, and a toppings dispenser platform attached to the at least one platform support member. The toppings dispenser is secured to the toppings dispenser platform.

Example 9 is a system as in any of Examples 1-8, wherein the toppings dispenser is attached to a top of the ice chest such that the spout is accessible to a user standing to a side of the system.

Example 10 is a system as in any of Examples 1-9, wherein the housing is configured to hold eight receptacles in a 4×2 configuration.

Example 11 is a system as in any of Examples 1-10, further comprising a generator providing power to the ice chest.

Example 12 is a system as in any of Examples 1-11, wherein the ice chest further includes: an ice chest casing attached to the vehicle and an ice chest insert configured to be removably inserted in the ice chest casing. The ice chest insert is configured to maintain a low temperature for storing the pre-packaged frozen confection.

Example 13 is a system as in any of Examples 1-12, wherein the toppings dispenser further includes a tube providing fluid communication between the receptacle and the spout.

Example 14 is a system as in any of Examples 1-13, wherein a plurality of tubes and a plurality of spouts are in fluid communication with a single receptacle.

Example 15 is a method of providing a pre-packaged frozen confection. The method includes storing the pre-packaged frozen confection in an ice chest attached to a vehicle. The method further includes transporting the vehicle, wherein the vehicle includes: at least three wheels, an ice chest secured to the vehicle between two of the wheels, and a toppings dispenser attached to at least one of the vehicle or the ice chest and configured to dispense a liquid topping. The toppings dispenser includes: at least one receptacle configured for holding a liquid topping, a housing attached to at least one of the vehicle or the ice chest, the housing configured to hold the at least one receptacle, and a spout in fluid communication with the receptacle.

Example 16 is a method as in Example 15, further comprising connecting the ice chest to a source of power.

Example 17 is a method as in any of Example 15-16, further comprising preparing the pre-packaged frozen confection to be food-grade and ready for immediate distribution to a consumer.

Example 18 is a method as in any of Example 15-17, further comprising applying the liquid topping to the pre-packaged frozen confection.

Example 19 is a method as in any of Example 15-18, wherein the vehicle is a pedal cycle.

Example 20 is a method as in any of Example 15-19, wherein the vehicle further includes an ice chest connection member and a platform attached to the ice chest connection member and disposed between two of the at least three wheels. The ice chest is secured to the platform and disposed between two of the at least three wheels.

In the foregoing Detailed Description, various features of the disclosure are grouped together in a single implementation for streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for dispensing a pre-packaged frozen confection, the system comprising:
   a vehicle comprising
      at least three wheels,
      and a seat;
   an ice chest secured to the vehicle at a first position on a first side of the seat;
   a toppings dispenser attached to the vehicle at a second position on a second side opposite the first side of the seat, the toppings dispenser comprising:
      at least one receptacle configured for holding a liquid topping;
      a housing attached to the vehicle, the housing configured to hold the at least one receptacle; and
      a spout in fluid communication through the housing with the receptacle.

2. The system of claim 1, wherein the ice chest is disposed between two of the at least three wheels of the vehicle.

3. The system of claim 1, the vehicle further comprising:
an ice chest connection member; and
an ice chest platform attached to the ice chest connection member and disposed between two of the at least three wheels;
wherein the ice chest is secured to the platform and disposed between two of the at least three wheels.

4. The system of claim 3, wherein the ice chest is secured to the platform at a backside of the seat.

5. The system of claim 3, wherein the ice chest is secured to the platform at a frontside of the seat.

6. The system of claim 1, wherein the vehicle is a pedal cycle.

7. The system of claim 1, wherein the vehicle is motorized.

8. The system of claim 1, wherein the toppings dispenser is attached to a top of the ice chest such that the spout is accessible to a user standing to a side of the system.

9. The system of claim 1, wherein the housing is configured to hold eight receptacles in a 4×2 configuration.

10. The system of claim 1, further comprising a power source connected to the ice chest.

11. The system of claim 1, wherein the ice chest further comprises:
an ice chest casing attached to the vehicle; and
an ice chest insert configured to be removably inserted in the ice chest casing;
wherein the ice chest insert is configured to maintain a low temperature for storing the pre-packaged frozen confection.

12. The system of claim 1, wherein the toppings dispenser further comprises a tube providing fluid communication between the receptacle and the spout.

13. The system of claim 12, wherein a plurality of tubes and a plurality of spouts are in fluid communication with a single receptacle.

14. The system of claim 1, wherein the pre-packaged frozen confection is stored in the ice chest.

15. A system for dispensing a pre-packaged frozen confection, the system comprising:
a vehicle comprising
at least three wheels,
a wheel hub disposed in a center of at least one wheel of the at least three wheels,
at least one platform support member attached to the wheel hub, and
a toppings dispenser platform attached to the at least one platform support member;
an ice chest secured to the vehicle;
a toppings dispenser secured to the toppings dispenser platform, the toppings dispenser comprising:
at least one receptacle configured for holding a liquid topping;
a housing attached to the vehicle, the housing configured to hold the at least one receptacle; and
a spout in fluid communication with the receptacle.

16. The system of claim 15, wherein the ice chest is disposed between two of the at least three wheels of the vehicle.

17. A method of providing a pre-packaged frozen confection, the method comprising:
storing the pre-packaged frozen confection in an ice chest attached to a vehicle; and
transporting the vehicle, the vehicle comprising:
at least three wheels and a seat;
an ice chest secured to the vehicle between two of the wheels at a position on a first side of the seat;
a toppings dispenser attached to the vehicle at a position on a second side of the seat opposite the first side of the seat and configured to dispense a liquid topping, the toppings dispenser comprising:
at least one receptacle configured for holding a liquid topping;
a housing attached to the vehicle, the housing configured to hold the at least one receptacle; and
a spout in fluid communication through the housing with the receptacle.

18. The method of claim 17, further comprising connecting the ice chest to a source of power.

19. The method of claim 17, further comprising preparing the pre-packaged frozen confection to be food-grade and ready for immediate distribution to a consumer.

20. The method of claim 17, further comprising applying the liquid topping to the pre-packaged frozen confection.

21. The method of claim 17, wherein the vehicle is a pedal cycle.

22. The method of claim 17, the vehicle further comprising:
an ice chest connection member; and
an ice chest platform attached to the ice chest connection member and disposed between two of the at least three wheels;
wherein the ice chest is secured to the ice chest platform and disposed between two of the at least three wheels.

* * * * *